United States Patent [19]

Meidhof

[11] Patent Number: 5,531,587
[45] Date of Patent: Jul. 2, 1996

[54] CLOSABLE EXTRUSION NOZZLE FOR THERMOPLASTIC MATERIALS

[75] Inventor: Helmuth Meidhof, Grossostheim, Germany

[73] Assignee: Rieter Automatik GmbH, Germany

[21] Appl. No.: 318,735

[22] PCT Filed: Feb. 8, 1994

[86] PCT No.: PCT/EP94/00361

§ 371 Date: Dec. 16, 1994

§ 102(e) Date: Dec. 16, 1994

[87] PCT Pub. No.: WO94/19169

PCT Pub. Date: Sep. 1, 1994

[30] Foreign Application Priority Data

Feb. 18, 1993 [DE] Germany .................. 43 05 037.9

[51] Int. Cl.⁶ .................................................. B29C 47/12
[52] U.S. Cl. ............................ 425/382 R; 425/464
[58] Field of Search .......................... 425/464, 382.2, 425/382 R, 198

[56] References Cited

U.S. PATENT DOCUMENTS

| | | | |
|---|---|---|---|
| 3,245,112 | 4/1966 | Williamson | 425/464 |
| 3,336,633 | 8/1967 | Curran, Jr. | 425/464 |
| 3,397,426 | 8/1968 | Fujita et al. | 425/328.2 |
| 3,480,995 | 12/1969 | Lenk | 425/464 |
| 3,912,439 | 10/1975 | Newman, Jr. | 425/464 |
| 4,479,768 | 10/1984 | Kube et al. | 425/198 |
| 5,147,197 | 9/1992 | Hodan et al. | 425/464 |

FOREIGN PATENT DOCUMENTS

| | | | |
|---|---|---|---|
| 0093358 | 11/1983 | European Pat. Off. | 425/464 |
| 849726 | 9/1960 | United Kingdom | 425/198 |

*Primary Examiner*—Robert Davis
*Attorney, Agent, or Firm*—Banner & Allegretti, Ltd.

[57] ABSTRACT

The invention concerns a closable extrusion nozzle for thermoplastic materials, with a nozzle plate (4) containing nozzles permitting the extrusion of the thermoplastic material from a hopper (1) and with a perforated plate (7), disposed upstream of the nozzle plate, whose apertures (8) can be brought in and out of alignment with the nozzles by displacing the perforated plate (7) with respect to the nozzle plate (4). The nozzle plate (4), which is U-shaped in cross-section, with the arms of the U at right angles to the direction of displacement of the perforated plate, is designed as a housing for the perforated plate (7) enclosed within it. A sealing surface (15) on the perforated plate (7) rests against the flat housing floor (5) in which the nozzles (6) are located, there being a gap between the perforated plate (7) and the housing at least in the curved regions (16, 17) of the floor, and the region in which the seal is formed by the sealing surface (15) resting against the floor (5) being limited to a narrow zone round the nozzles (6).

3 Claims, 1 Drawing Sheet

CLOSABLE EXTRUSION NOZZLE FOR THERMOPLASTIC MATERIALS

BACKGROUND OF THE INVENTION

The invention concerns a closable extrusion nozzle for thermoplastic materials with a nozzle plate containing nozzles that permit extrusion of the plastic material from a hopper, and with a perforated plate arranged upstream of the nozzle plate, whose apertures can be brought in and out of alignment with the nozzles by displacing the perforated plate relative to the nozzle plate.

Such an extrusion nozzle is known from the European Patent 0 093 358. There, the design described in the patent consists of the perforated plate that is located downstream of a flat nozzle plate. The perforated plate is pressed against the nozzle plate by recesses in the nozzle plate and a spring assembly resulting in a seal between the nozzle plate and the perforated plate when the nozzles are not aligned with the apertures of the perforated plate. The nozzles and the apertures are brought in and out of alignment by a sliding mechanism that allows to open and close the extrusion nozzle. The recesses of the nozzle plate grip the rims of the perforated plate like U-channels that result in protrusions on the exit side of the perforated plate that interfere with the access to the entire width and length of the perforated plate. The patent also mentions that the perforated plate can be located above the nozzle plate, but it does not provide any details.

SUMMARY OF THE INVENTION

The objective of the invention is to improve the known extrusion nozzle in such a way that a more compact design is achieved that allows access to the entire exit surface of the nozzle plate. The invention achieves this by a nozzle plate design featuring a U-shaped cross section perpendicular to the sliding direction that encloses the perforated plate like a housing, and by a perforated plate design featuring a sealing surface that rests against the flat housing bottom in which the nozzles are located, and by restricting the sealing contact of the sealing surface to a narrow area around the nozzles and leaving a gap between the perforated plate and the housing at least in the curved areas of the housing.

By placing the perforated plate into the U-shaped housing formed by the nozzle plate, a suitable support is obtained for the perforated plate within the nozzle plate that eliminates any protrusions for attaching the perforated plate. The exit side of the nozzle plate, which is the housing bottom, presents a free surface that can easily be scraped for example with a knife or similar tool. The extrusion nozzle may also be mounted at an angle, depending on the hopper layout, because the extrusions that exit the nozzles at an angle can separate freely from the housing bottom.

A useful design feature of the sealing surface of the perforated plate is a slightly convex shape perpendicular to the sliding direction. This will ensure a good seal between the surfaces of the perforated plate and the housing bottom by allowing the housing bottom to adjust to the convex shape under load. In addition, the housing bottom will be slightly curved when the extrusion nozzle is mounted, providing a snug fit around the convex shape of the perforated plate and thereby providing a good seal.

A suitable extrusion nozzle design with respect to the accommodation of the perforated plate in the housing features projecting housing flanges that are bolted to a flat hopper base plate with a cutout, and provides the proper fit of the perforated plate between the housing bottom and the base plate through elastic contact of the bottom to its sealing surface that allows the perforated plate to slide.

This design defines a space between the base plate and the inside of the housing to accommodate a properly fitted perforated plate and provides for its support by the base plate on one side and by the housing bottom on the other side in a manner that allows the perforated plate to slide.

DETAILED DESCRIPTION OF THE PREFERRED EMBODIMENTS

Figure 1:
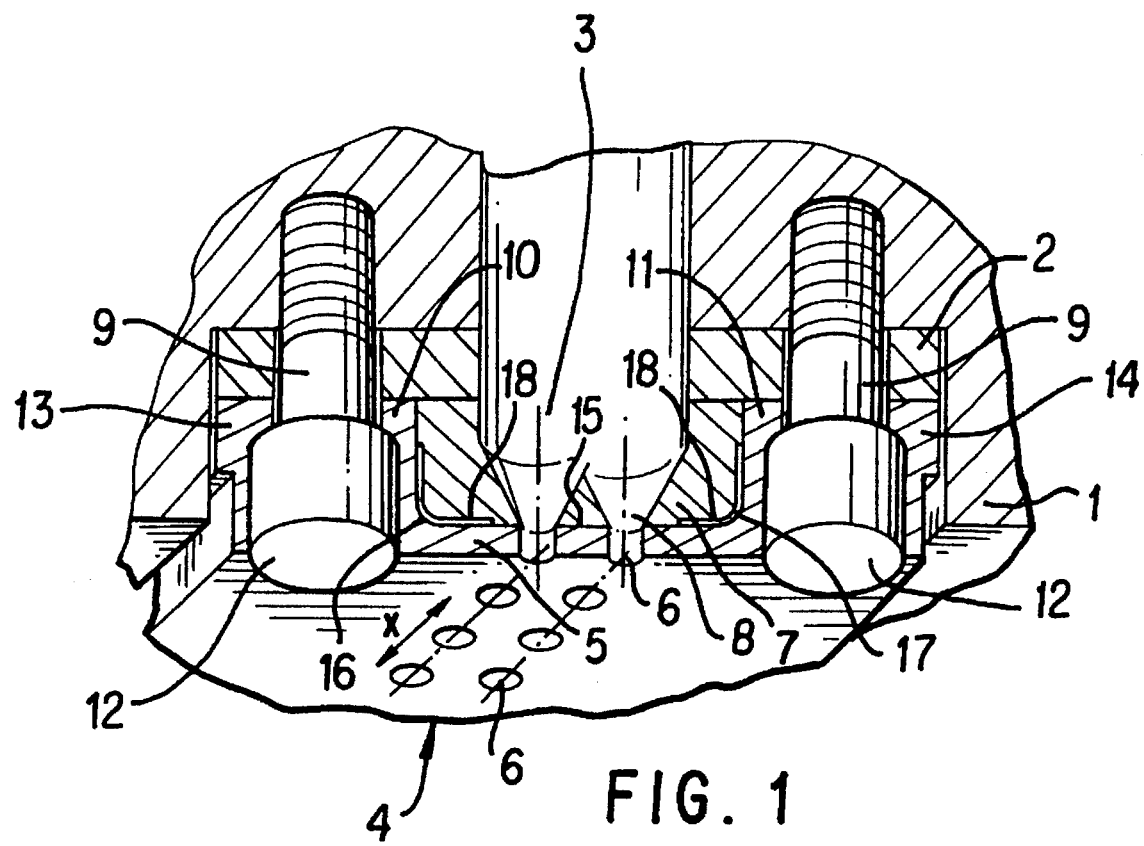
FIG. 1 a sectioned extrusion nozzle with two rows of nozzles (3-dimensional view), FIG. 2 a section of the design of FIG. 1 that represents a perforated plate with a slightly convex surface opposite the housing bottom that is not shown in FIG. 2.

FIG. 1 shows a sectional view of the hopper 1 and the base plate 2 for a tank with the liquid thermoplastic material. The base plate 2 has a cutout 3 to allow the plastic to pass through. The nozzle plate 4 having a U-shaped cross section is attached to the base plate 2. Thereby, the nozzle plate forms a housing that consists of the walls 10 and 11 and the connecting bottom 5. The perforated plate 7 is placed in the space between the walls 10 and 11, the bottom 5 and the base plate 2. The perforated plate can be moved along the longitudinal axis of the nozzle plate 4, which means parallel to the walls 10 and 11, by a sliding mechanism that is not shown. The longitudinal axis of the nozzle plate 4 is shown in the 3-dimensional view of FIG. 1. The assembly is held together by the bolts 9 that are screwed into the hopper 1 and that press the flanges 13 and 14 of the nozzle plate 4 with their bolt heads 12 against the base plate 2. Thereby, the perforated plate 7 is enclosed in such a way that its sealing surface 15 presses against the facing surface of the bottom 5 of the nozzle plate 4.

It is important that the distance between the bottom plate 5 and the base plate 2 is sized correctly to accommodate the fitted perforated plate 7 in a manner that allows it to slide while providing a snug contact of its sealing surface 15 with the bottom plate 5 of the nozzle plate 4. The required tension within the nozzle plate 4 is achieved by providing a gap 18 in the curved areas 16, 17 of the nozzle plate 4, as shown in FIG. 1. This gap ensures that the bottom 5 of the nozzle plate 4 can be slightly bent towards the perforated plate relative to the walls 10 and 11, as may be required due to the thickness of the perforated plate 7.

The bottom 5 of the nozzle plate 4 is fitted with the nozzles 6, that are aligned during operation with the corresponding apertures 8 in the perforated plate 7, as shown. In this case, liquid plastic can pass to the outside from the hopper 1 through the cutout 3, the apertures 8 and the nozzles 6. Sliding the perforated plate 7 along its longitudinal axis (double arrows) will bring the apertures 8 and the nozzles 6 out of alignment and prevent operation.

Figure 2:
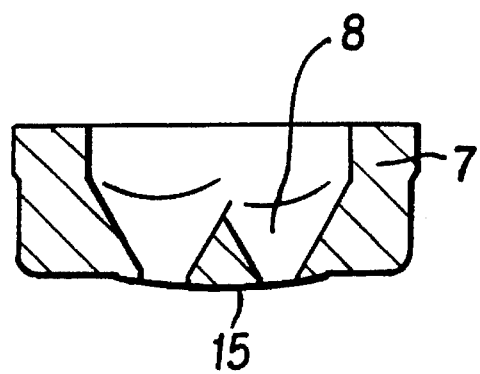

FIG. 2 shows a perforated plate 7 with its apertures 8 and a slightly convex sealing surface 15. This convex surface is shown exaggerated in FIG. 2. The differences in height are in the range of less than 1/10 mm. This slightly convex surface causes the bottom of the nozzle plate which is not shown in FIG. 2 (item 5 of FIG. 1) to adjust to the convex sealing surface 15, ensuring a particularly good sealing effect in this area. It certainly ensures that any remaining gaps between the bottom 5 and the perforated plate 7 are avoided that otherwise may lead to leakage.

I claim:

1. A closable extrusion nozzle for thermoplastic materials comprising a nozzle plate (4) containing nozzles (6) that permit extrusion of the plastic material from a tank (1), and a perforated plate (7) arranged upstream of the nozzle plate (4), whose apertures (8) can be brought in and out of alignment with the nozzles (6) by displacing the perforated plate (7) in a sliding direction relative to the nozzle plate (4), wherein the nozzle plate (4) is designed as a housing (5, 10, 11) with a U-shaped cross section perpendicular to the sliding direction of the enclosed perforated plate (7) wherein a sealing surface (15) of the perforated plate (7) rests against a flat bottom (5) of the housing (5, 10, 11) in which the nozzles (6) are located, wherein a gap (18) is provided between the perforated plate (7) and the housing (5, 10, 11) at least in curved areas (16, 17) of the housing (5, 10, 11), and wherein the sealing surface (15) that faces the bottom (5) is restricted to a narrow area around the nozzles (6).

2. An extrusion nozzle in accordance with claim 1, wherein the sealing surface (15) of the perforated plate (7) has a slightly convex shape perpendicular to the sliding direction, to which the bottom (5) of the housing (5, 10, 11) adjusts under load.

3. An extrusion nozzle in accordance with claim 1 or 2, wherein the housing (5, 10, 11) which includes flanges that project from walls (10, 11) of the housing (5, 10, 11), and a flat base plate (2) with a cutout, that are attached to the tank (1), and wherein the perforated plate (7) is fitted between the base plate (2) and the bottom (5) of the housing (5, 10, 11) such that the contact of the bottom (5) with the sealing surface (15) of the perforated plate (7) is elastic and ensures that the perforated plate (7) can slide.

* * * * *